Patented May 2, 1950

2,505,818

UNITED STATES PATENT OFFICE 2,505,818

SOLUBILIZING TANNING BARK EXTRACTS WITH WASTE SULFITE LIQUORS

Kenneth T. Williams, Berkeley, and Earl F. Potter, Richmond, Calif., assignors to the United States of America as represented by the Secretary of Agriculture No Drawing. Application July 23, 1946, Serial No. 685,634

5 Claims. (Cl. 8—94.31)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to tannin extracts of bark of trees, particularly the bark of western hemlock, Tsuga heterophylla.

Extracts of bark from the logs of trees such as the western hemlock, and especially from logs that have floated in water, contain varying amounts of relatively insoluble material. The amount of such insoluble material varies over a wide range and in some instances approaches 50 percent in extracts that have been concentrated by evaporation to approximately 15 percent total solids.

It is the primary object of this invention, accordingly, to provide a method whereby the amount of insoluble material in bark extracts is reduced to such an extent that concentrations of the extracts can be made which will be highly suitable for use in tanning hides for the making of leather. Other objects will be apparent from the description of the invention.

According to the invention, sulfite liquor, produced in a conventional manner during the cooking of wood in the manufacture of wood pulp and containing sulfite ions and alkaline earth metal ions, in particular about 0.5 percent of calcium or magnesium ions, is modified solely by treatment with a hydroxide such as calcium hydroxide, ammonium hydroxide, and alkali metal hydroxides like sodium hydroxide, to raise the pH to approximately 5, and all or substantially all of the calcium and magnesium ions are then removed by precipitation by the addition of a water-soluble precipitant as required. In the case of the calcium ions, a precipitant such as a water-soluble ammonium or alkali metal oxalate, sulfate, or phosphate is required, whereas in the case of the magnesium ions, a water-soluble alkali metal or ammonium phosphate would be required. Thus, in effect, while the calcium and magnesium ions are replaced by ammonium or alkali metal ions the sulfite ions of the liquor remain in solution. This modified sulfite liquor is mixed with aqueous bark extract, which includes extracts of bark obtained by extraction with water alone, by extraction with mixtures of water and organic solvents such as acetone, by extraction with aqueous sulfite solutions such as sodium sulfite solution, or by extraction with aqueous alkali hydroxide solution. The mixture is heated to a temperature of about from 150° to 212° F. for from 2 to 12 hours. The effect of this mixing and heating is to substantially solubilize the insoluble material originally present in the bark extract.

The following examples are illustrative of the invention.

Example I

Hemlock bark is extracted with hot water, and the resulting extract is evaporated to about 15 percent total solids. It is found that about 15 percent, or perhaps as much as 50 percent of the total solids present in the resulting concentrated extract is insoluble at this concentration. Sulfite liquor, produced during the cooking of wood in the manufacture of wood pulp and containing about 0.5 percent calcium ions, is modified by treatment with a hydroxide to raise the pH to approximately 5, and the calcium ions are almost completely replaced with sodium ions by the addition of sodium oxalate. The concentrated extract of the hemlock bark is mixed with the sulfite liquor modified as described above in such proportions that three-fourths of the total dissolved material present in the resulting mixture came from the extract obtained by leaching the hemlock bark, and one-fourth of the total dissolved material came from the modified sulfite liquor. The mixture is heated to about 180° F. for about 3 hours and then is evaporated to about 15 percent total solids. The insoluble material thereafter present in the mixture is then less than 1 percent.

Example II

Hemlock bark is extracted with a mixture of water and an organic solvent. For instance, a water-and-acetone mixture may be used, but other organic solvents also can be employed instead of acetone. The extract obtained by leaching the bark is mixed with the sulfite liquor modified as described in Example I, above, in such proportions that three-fourths of the total dissolved material present in the resulting mixture came from the extract obtained by leaching the bark, and one-fourth of the total dissolved material came from the modified sulfite liquor. The mixture is heated to about 180° F. for about three hours and then evaporated to about 15 percent total solids. The insoluble material thereafter present in the mixture is less than 1 percent.

Example III

Hemlock bark is extracted with an aqueous sulfite solution. For instance, a 0.1 percent sodium sulfite solution may be used, but other sulfites also may be employed. The extract obtained by leaching the bark is mixed with sulfite liquor modified as described in Example I, in such proportions that three-fourths of the total dissolved material present in the resulting mixture came from the extract obtained by leaching the hemlock bark, and one-fourth of the total dissolved material came from the modified sulfite liquor. The mixture is heated to about 180° F. for about 3 hours and then is evaporated to about 15 percent total solids. The insoluble material thereafter present in the mixture is less than 1 percent.

*Example IV*

Hemlock bark is extracted with an aqueous alkali hydroxide solution. As an instance, a 0.15 percent sodium hydroxide solution may be used, but other alkali hydroxides also can be used. The extract obtained by leaching the bark is mixed with sulfite liquor modified as described in Example I in such proportions that three-fourths of the total dissolved material present in the resulting mixture came from the extract obtained by leaching the hemlock bark, and one-fourth of the total dissolved material came from the modified sulfite liquor. The mixture is heated to about 180° F. for about 3 hours and then is evaporated to about 15 percent total solids. The insoluble material thereafter present in the mixture is then less than 1 percent.

Variations of the invention as disclosed in the examples can be made. For example, the proportions of bark extract and of modified sulfite liquor, mixed to give the desired solubility in the concentrated extract, may be varied with the concentrations of each, with the amount of relatively insoluble material originally in the bark extract, and with other characteristics. It is preferred that the bark extract and modified sulfite liquor be mixed in such proportions that three-fourths of the total dissolved material present in the resulting mixture shall have come from the extract obtained by leaching the bark, and one-fourth of the total dissolved material shall have come from the modified sulfite liquor.

The modified sulfite liquor can also be added to the bark extract immediately following the leaching process, as, for example, while the extract comes from the bark, or after varying degrees of evaporation of the bark extract.

The bark extract can be concentrated either before it is mixed with the modified sulfite liquor, as indicated in Example I, or after it is mixed therewith. In any case, the percent of insoluble material present in the final concentrated extract will be materially reduced.

Having thus described our invention, we claim:

1. A method of solubilizing the insoluble material contained in aqueous bark extract, comprising mixing the aqueous bark extract with a sulfite liquor produced during the cooking of wood in the manufacture of wood pulp and modified solely by having had its pH raised to approximately 5 and its alkaline earth metal ions substantially replaced by an ion selected from the group consisting of alkali metal ions and the ammonium ion, and heating this mixture at a temperature of about from 150° F. to 212° F.

2. The method of claim 1 wherein the aqueous bark extract is an aqueous extract of western hemlock bark.

3. A method of solubilizing the insoluble material contained in aqueous bark extract, comprising mixing the aqueous bark extract with a sulfite liquor produced during the cooking of wood in the manufacture of wood pulp and modified solely by having had its pH raised to approximately 5 and its alkaline earth metal ions substantially replaced by sodium ions, and heating this mixture at a temperature of about from 150° F. to 212° F.

4. A method of solubilizing the insoluble material contained in an aqueous extract of western hemlock bark, comprising mixing the aqueous extract with a sulfite liquor produced during the cooking of wood in the manufacture of wood pulp and modified solely by having had its pH raised to approximately 5 and its alkaline earth metal ions substantially replaced by sodium ions, said extract and said liquor being mixed in such proportions that about three-fourths of the total dissolved material present in the mixture is derived from the extract and the remainder of the total dissolved material is derived from the liquor, and heating this mixture at a temperature of about 180° F. for about three hours.

5. A method of solubilizing the insoluble material contained in an aqueous extract of western hemlock bark, comprising mixing the aqueous extract with a sulfite liquor produced during the cooking of wood in the manufacture of wood pulp and modified solely by having had its pH raised to approximately 5 and its alkaline earth metal ions substantially replaced by sodium ions, said extract and said liquor being mixed in such proportions that about three fourths of the total dissolved material present in the mixture is derived from the extract and the remainder of the total dissolved material is derived from the liquor, heating this mixture at a temperature of about 180° F. for about three hours, and then evaporating it to about 15 percent total solids.

KENNETH T. WILLIAMS.
EARL F. POTTER.

REFERENCES CITED

The following references are of record in the file of this patent:

UNITED STATES PATENTS

| Number | Name | Date |
| --- | --- | --- |
| 909,343 | Stewart | Jan. 12, 1909 |
| 940,394 | Kampfmiller | Nov. 16, 1909 |
| 1,063,428 | Gianoli | June 3, 1913 |
| 1,147,245 | Hurt | July 20, 1915 |
| 1,327,105 | Landmark | Jan. 6, 1920 |
| 1,563,010 | Breedis | Nov. 24, 1925 |
| 2,244,410 | Wallace | June 3, 1941 |

OTHER REFERENCES

"Chem. of Leather Mfg.," by J. A. Wilson, 2nd ed., 1929, Chem. Catalog Co., N. Y. C., vol. 2, pages 774, 775, 776.